Jan. 23, 1962 R. W. MAAS ET AL 3,018,069
BALLOON FLIGHT CONTROL
Filed Nov. 27, 1957 2 Sheets-Sheet 1
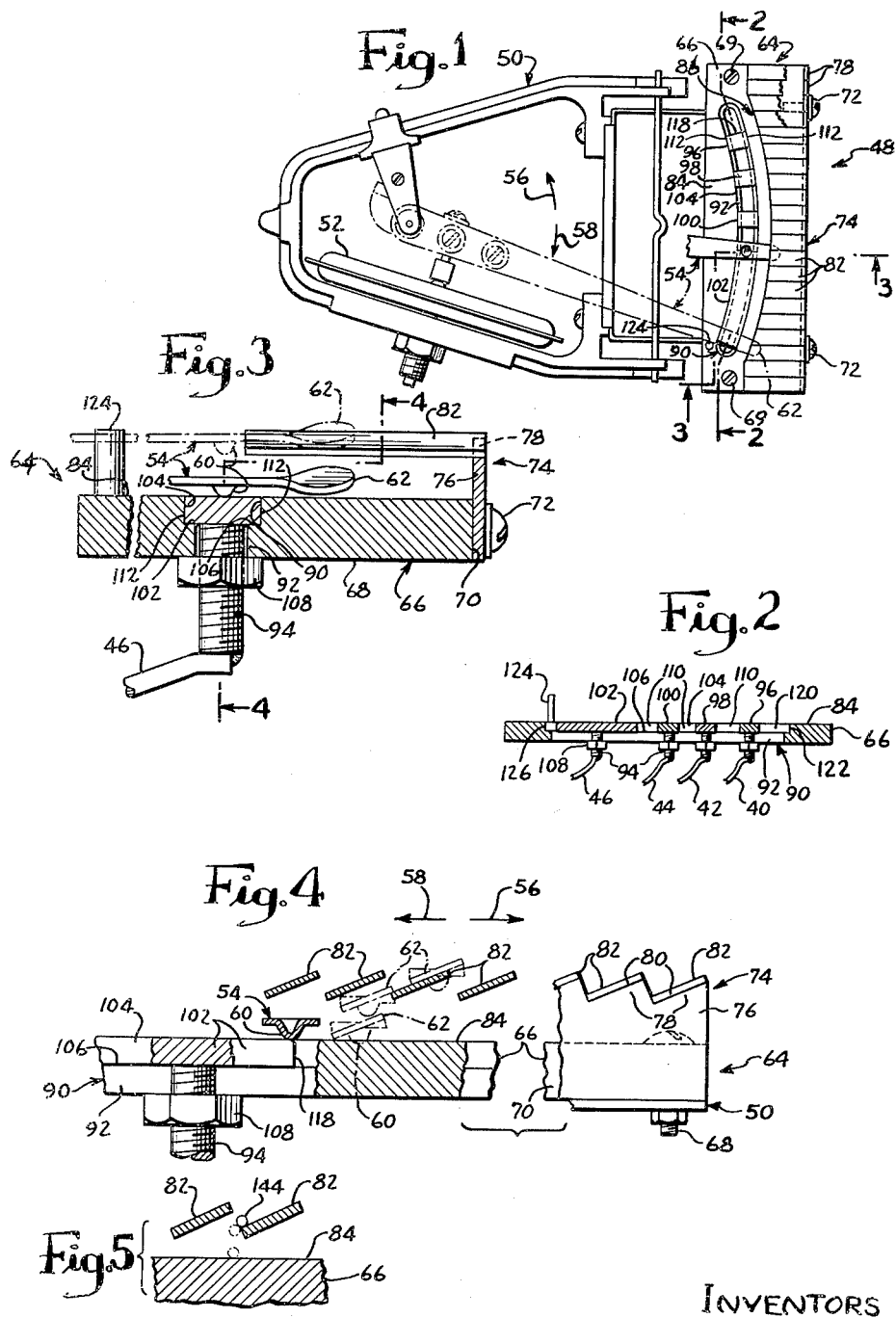
INVENTORS
RAYMOND W. MAAS
RUDOLPH B. THORNESS
by: J. A. O'Connell
Louis Sheldon ATTYS

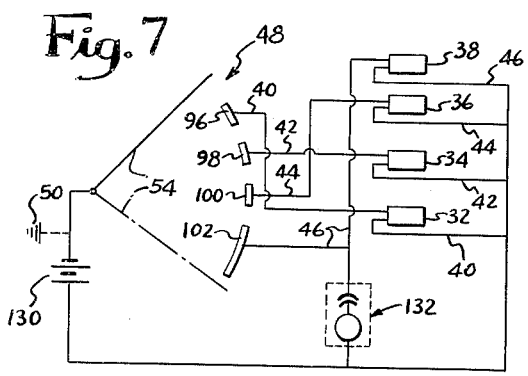
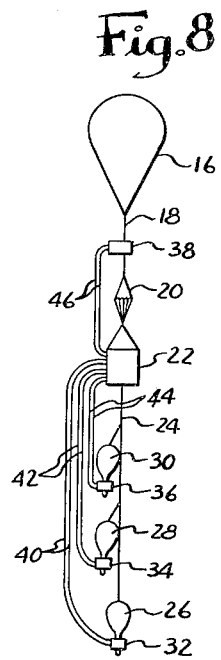
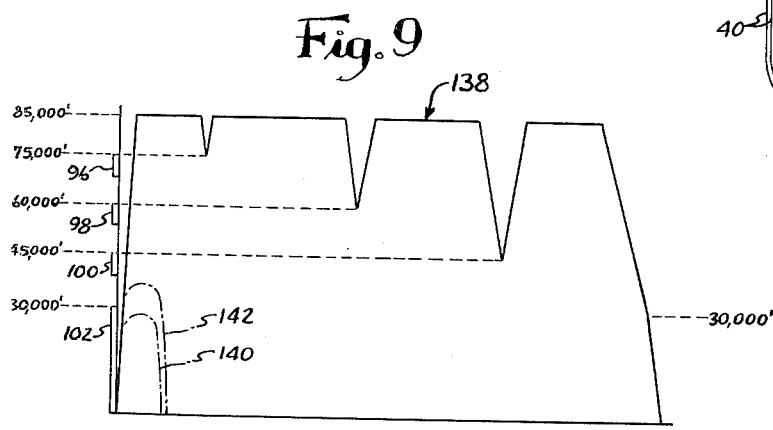
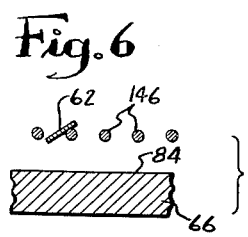

3,018,069
BALLOON FLIGHT CONTROL
Raymond W. Maas, Kalamazoo, Mich., and Rudolph B. Thorness, Minneapolis, Minn., assignors, by mesne assignments, to the United States of America as represented by the Secretary of the Navy
Filed Nov. 27, 1957, Ser. No. 699,431
8 Claims. (Cl. 244—32)

This invention relates to apparatus for programming high altitude balloon flights and to switch mechanism therefor.

It is an object of the invention to provide a novel ballast-release and blowdown switch mechanism for automatically programming a balloon flight.

Another object is to provide a simple control which is readily variable to afford the desired program of a balloon flight or other operation.

An additional object is to provide a novel ratchet switch mechanism.

Further objects and advantages of the invention will appear as the description proceeds.

The invention will be better understood on reference to the following description and accompanying drawings, wherein:

FIG. 1 is an elevational view of a switch mechanism embodying features of the invention.

FIG. 2 is a sectional view taken at 2—2 in FIG. 1 and turned 90°.

FIG. 3 is a magnified view, partly in section and partly in elevation, taken at 3—3 in FIG. 1.

FIG. 4 is a broken view, partly in section and partly in elevation, taken at 4—4 in FIG. 3.

FIG. 5 is similar to a part of FIG. 4 but shows a modified switch arm tip.

FIG. 6 is similar to FIG. 5 but shows a modified ratchet tooth construction.

FIG. 7 is a circuit diagram embodying features of the invention.

FIG. 8 is a diagram of a balloon assembly in flight in accordance with the invention.

FIG. 9 is a diagram showing graphically a normal flight and two failing flights.

Referring now more particularly to the drawings, disclosing illustrative embodiments of the invention, there is shown diagrammatically (FIG. 8) at 16 a balloon envelope from which hangs a load line 18 supporting a parachute 20 suspending a gondola 22 housing the payload such as telemetering and/or other instrumentation. An auxiliary line 24 hanging from the gondola 22 suspends inverted closed bags containing respectively first, second, and third ballasts (ballast units) 26, 28, and 30, the necks of the bags respectively passing through the barrels of explosive (squib) cutters 32, 34, and 36. The load line 18 passes through the barrel of a similar cutter 38. Wiring 40, 42, 44, and 46 from the respective cutters 32, 34, 36, and 38 extends into the gondola 22 and is suitably connected to switch mechanism 48 (FIG. 1) adapted to control the balloon flight by controlling the sequential firing of the cutters in accordance with the desired program.

The switch mechanism 48 comprises a frame 50 supporting an aneroid bellows 52 actuating a switch contact arm 54 to swing in the direction of the arrow 56 with ascent of the balloon and in the opposite direction 58 with descent of the balloon. The arm 54 is grounded to the frame 50 and has near its outer end a contact dent 60 beyond which the arm is preferably twisted to provide an inclined paddle or tip 62 which serves as a ratchet pawl. The frame 50 also supports a contact unit 64 cooperating with the arm 54, as will appear.

The contact unit 64 comprises an insulation block 66 secured at 68 to the frame 50. To one longitudinal side 70 of the block 66 is secured as at 72 a louver-like comb 74 comprising a strip 76 having a ratchet-like row of teeth 78 to whose risers 80 is soldered a series of cantilever slats 82 spaced from the upper face 84 of the block a distance exceeding the combined height of the dent 60 and tip 62 measured normal to the face (FIGS. 3 and 4). The free ends of the slats 82 are preferably arranged to provide an arcuate pattern as indicated at 86 conforming to the sweep of the tip 62. The arm 54 is preferably resiliently biased toward the block 66, and the tip 62 is sufficiently thin to be capable of sliding up and down any slat 82 without interference from the adjacent slat.

The block 66 is formed with a T-slot 90 (FIGS. 1 to 4) curved in conformity with the sweep of the dent 60. The narrow part 92 of the slot 90 is adapted to freely receive the shanks 94 of screw contacts 96, 98, 100, and 102 whose heads are received in the wide part 104 of the slot and clamped to the slot ledge 106 by nuts 108, with the tops of the heads preferably flush with the block face 84. The contacts 96, 98, 100, and 102 are spaced apart as at 110, their positions being determined by calibration, and are employed for control of the respective cutters 32, 34, 36, and 38. The radially spaced edges 112 of each contact head are preferably curved in conformity with the curvatures of and are adapted to slide along the sides of the wide part 104 of the slot 90 for adjustment along the slot. The block 66 may bear atmospheric pressure indicia (not shown), as at an edge of the slot 90. The low pressure end 118 of each contact head is preferably radial. A substantial space 120 separates the low pressure end contact 96 from the low pressure end 122 of the slot 90. The block 66 has a stop 124 at the ground pressure end 126 of the slot 90.

With the cutters 32, 34, 36, and 38, switch arm 54, and contacts 96, 98, 100, and 102 connected with a battery 130 (FIG. 7), and a flasher unit 132 in parallel with the cutter 38 preferably included, the switch mechanism 48 is assembled and installed for the balloon flight as shown in FIG. 1, with the tip 62 resting on a slat 82 adjacent the stop 124 as shown in dot-dash lines, the stop preventing the tip from moving down the slat and thereby preventing premature engagement of the dent 60 with the high pressure (blowdown) end contact 102 before the balloon is launched.

As the balloon soars, the expanding bellows 52 swings the switch arm 54 in the direction of the arrow 56, causing the switch arm tip 62 to ride up the ramp of the slat 82 then supporting the tip. On completion of its upward traverse of that slat, the tip 62 will snap down off the top of that slat and onto the next slat, and so on as the ascent continues. Whenever the balloon descends, the tip 62 will ride down the nether slat, and, if any descent is sustained to such an extent that the tip drops down off a slat, the switch arm 54 will snap the tip onto the block face 84 if at such time the dent 60 is in a space 110 or 120, or will snap the dent onto a contact, as the case may be. Once the tip 62 snaps off of the bottom of a slat 82, the bias on the arm 54 will keep the arm free of the slats for the remainder of the flight. While the dent 60 is in the space 120 or any space 110, the tip 62 will be stationary on the block face 84 or will ride on the face, in one direction 56 or the other 58, depending on whether the altitude is maintained, increasing, or decreasing. When the dent 60 while moving in the direction 58 touches the edge 118 of a contact, a circuit is closed, firing the corresponding cutter. A cutter will of course be fired if, pursuant to descent of the balloon, the switch arm 54 snaps the dent 60 into touch with a contact.

A balloon launched early enough in the day will normally proceed to ceiling altitude without the necessity for releasing ballast. At sunset and as night sets in, the consequent cooling and thus the reduction in volume of the lift gas will cause the balloon to descend. It is to prevent undesired complete descent and enable the balloon to reascend to ceiling altitude that ballasting is provided.

In the illustrative example of the invention, the balloon is designed to reach and remain for considerable periods at a predetermined ceiling altitude, and provision is made for a flight to terminate after the fourth day. On the first night the tip 62, pursuant to the descent of the balloon, will ride down and snap off the bottom of the nether salt and move in the direction of the arrow 58 until the dent 60 touches the low pressure end 118 of the first contact 96, closing the circuit for and firing the first cutter 32, which cuts the neck of the bag off and dumps the first ballast 26, whereupon the balloon will reascend to ceiling altitude, and the tip 62 during such reascent will ride along the block 66 in the direction 56. With the second night's descent, the arm 54 will retrogress in the direction 58 far enough to bring the dent 60 into touch with the low pressure end 118 of the second contact 98 (the first contact 96 then being "dead" inasmuch as its circuit is open at the fired cutter 32), closing the circuit for and firing the second cutter 34 to cut the neck of the bag off and dump the second ballast 28, whereupon the balloon again will rise to ceiling altitude. Similarly, engagement of the dent 60 with the low pressure end 118 of the third contact 100 (the first and second contacts 96 and 98 then being "dead") will fire the cutter 36, resulting in the dumping of the third ballast 30, whereupon the balloon will again proceed to ceiling altitude. The device is designed so that descent (on the fourth night) to a level somewhat above the upper altitude limit of aircraft airlanes will bring the dent 60 into touch with the low pressure end 118 of the fourth contact 102, closing the circuit for and firing the fourth (blowdown) cutter 38, which severs the load line 18, whereupon the gondola 22 is parachuted to earth to minimize hazard to aircraft.

Should the balloon for any reason fail initially to ascend sufficiently to enable any of the ballasts to be dumped, the dent 60 during the ensuing descent will touch the contact 102 to fire the blowdown cutter 38 and thus bring about complete descent of the gondola 22, as indicated in the two examples in dot-dash lines at 140 and 142 in FIG. 9.

If desired, a radio control (not shown) may be provided, operated from the ground, to fire the blowdown cutter 38 at will.

At and following the firing of the blowdown cutter 38 the flasher 132 will operate to warn aircraft pilots of the falling load and aid in tracking the load for recovery.

FIG. 9 shows diagrammatically at 138 a plot of balloon altitude against time for a typical normal flight and at 140 and 142 similar plots for faulty flights. The ceiling altitude is here assumed to be 85,000 feet, the ballast dumping altitudes to be respectively 75,000, 60,000, and 45,000 feet, and the blowdown altitude 30,000 feet. For different flights of the same duration, the calibrated adjustments of the contacts will vary, depending on, among possibly other things, the ceiling altitude for which the balloon is designed, and climatic conditions. The weights of the ballasts and the number of ballasts and associated cutters and contacts will depend on, among other things, the number of nights during which the balloon is to remain aloft.

In FIG. 5 a modified switch arm tip 144 is employed, and in FIG. 6 the slats are replaced by pins 146, the action being substantially the same as with the above described construction.

While preferred embodiments have been described, they should be regarded as examples of the invention and not as restrictions or limitations thereof as changes may be made in the construction and arrangement of the parts without departing from the spirit and scope of the invention.

We claim:

1. In combination with a high altitude balloon designed to have a predetermined ceiling altitude, the balloon having a load line suspending a parachute, a load below the parachute, an auxiliary line below the load, and a predetermined number of ballast-containing bags suspended from the auxiliary line, a battery, electrically fired explosive cutters electrically connected to a side of the battery and mechanically connected with and respectively operative to successively dump the ballasts and cut the load line, a switch contact arm connected to the other side of the battery, a row of switch contacts electrically connected to the respective cutters, an aneroid bellows operatively connected with the arm to sweep the arm over the row of contacts in one direction in response to ascent of the balloon and in the opposite direction in response to descent of the balloon, the contact connected with the load line cutter extending from a point under the arm position corresponding to ground atmospheric pressure to a point under the arm position corresponding to atmospheric pressure at an altitude somewhat above the upper limit of the airlanes, the other contacts being disposed under arm positions corresponding to different altitudes substantially above the upper limit of the airlanes and substantially below ceiling altitude, and a ratchet comprising the contact arm and a set of cooperating teeth extending in a row throughout the sweep of the arm, the bellows, arm, teeth, and contacts being mounted on a support carried by the balloon, the arm at launching of the balloon being disposed over and engaging a tooth, the teeth being openly spaced and the arm being biased in a direction to cause the arm to pass entirely through a space between a pair of teeth on descent of the balloon sufficient to disengage the arm from the higher altitude tooth of that pair, the row of contacts being arranged to be engaged by the arm only after such disengagement, whereby, on ascent of the balloon from launching to ceiling altitude, the arm will undergo full sweep over the teeth, and, on each nighttime descent from ceiling altitude, the number of such nights being equal to the number of cutter contacts, the arm will engage one or another of the ballast contacts and dump a ballast on the first engagement of the arm with each such contact, each ballast being of such weight that on the dumping thereof the balloon reascends to ceiling altitude, and, on any descent of the balloon sufficient to bring about engagement of the arm with the load line cutter contact, the parachute and the apparatus suspended therefrom will be released from the balloon.

2. In combination with a high altitude balloon having a line suspending a load, apparatus supported by the balloon for programming the balloon flight, the apparatus comprising inverted closed bags of ballast suspended from the balloon, a cutter surrounding the load line, cutters surrounding the necks of the respective bags, each of the cutters being of the electrically fired explosive type, a pivoted switch contact arm, an aneroid bellows for swinging the arm in one direction or the other respectively with ascent and descent of the balloon, an insulation block having contacts arranged in a series coextensive with the part of the sweep of the arm corresponding to positions of the balloon from the ground to an altitude substantially below ceiling altitude, means biasing the arm toward the block, means electrically connecting the contacts to the several cutters, a source of electric energy connected to each of the cutters and to the arm, and means preventing engagement of the arm with any contact during initial ascent of the balloon to ceiling altitude, the latter means being inoperative to prevent engagement of the arm with the block after the first predetermined magnitude of descent of the balloon, the contact connected to the first-mentioned cutter being located at the bottom altitude end of the series of contacts, whereby, on each descent of the balloon, from ceiling altitude, sufficient to bring the arm into engagement for the first time with any of the ballast-controlling contacts, the corresponding cutter will fire, dumping the corresponding ballast, enabling the balloon to ascend toward ceiling altitude, and, on descent of the balloon sufficient to effect engagement of the arm with the load line cutter controlling contact, the load will be released from the balloon.

3. In combination with a high altitude balloon adapted to reach ceiling altitude and having a line suspending a load, apparatus supported by the balloon for programming the balloon flight, the apparatus comprising ballast, electrically fired devices for dumping predetermined quantities of ballast and for severing the load line, a switch contact arm, an aneroid bellows for sweeping the arm in one direction or the other respectively with ascent and descent of the balloon, contacts connected to the several devices and arranged in a series coextensive with the part of the sweep of the arm corresponding to positions of the balloon up to an altitude substantially below ceiling altitude, means biasing the arm toward the series of contacts, a source of electric energy connected to each of the devices and to the arm, and means preventing engagement of the arm with any contact during substantially sustained ascent of the balloon from launching to ceiling altitude and until the balloon has undergone a predetermined magnitude of descent, the contact connected to the line-severing device being located at the bottom altitude end of the series of contacts, whereby, on each descent of the balloon from ceiling altitude sufficient to bring the arm into engagement for the first time with any of the ballast-controlling contacts, the corresponding device will operate to dump ballast, enabling the balloon on each such dumping to ascend toward ceiling altitude, and, on descent of the balloon sufficient to effect engagement of the arm with the load line severing device controlling contact, the load will be released from the balloon.

4. The structure of claim 3, together with means enabling the number and positions of the several contacts to be varied to preset the desired flight program.

5. In combination with a high altitude balloon designed to reach a given ceiling altitude and carrying a payload and a plurality of ballast units, each ballast unit being of such weight that the dumping thereof will compensate for a predetermined nighttime loss of altitude to enable the balloon to reascend to its ceiling altitude, the number of ballast units being equal to a predetermined minimum number of nights of the same flight of the balloon, atmospheric pressure-responsive means operative on successive nighttime descents from ceiling altitude and at predetermined progressively lower intermediate altitudes of the balloon for successively dumping all of the ballast units and releasing the payload from the balloon at a still lower altitude, and means for preventing ballast-dumping and payload-release at any such intermediate altitude during substantially sustained ascent of the balloon from launching.

6. In combination with a high altitude balloon carrying a payload and a plurality of ballast units, means preventing dumping of ballast during substantially sustained ascent of the balloon from the launching to ceiling altitude, and means responsive to successive descents of predetermined progressively increasing magnitudes, each from ceiling altitude, for successively dumping the several ballast units at the respective lower altitudes.

7. The structure of claim 6, together with means responsive to descent of the balloon to a predetermined altitude below the lowest ballast-dumping altitude for releasing the payload from the balloon.

8. In combination with a high altitude balloon carrying a payload and ballast, means responsive to the altitude of the balloon for programming the dumpings of ballast to enable the balloon to spend a predetermined total time at ceiling altitude, and means responsive to the altitude of the balloon for releasing the payload from the balloon on partial descent of the balloon following the elapse of such total time.

References Cited in the file of this patent

UNITED STATES PATENTS

| | | |
|---|---|---|
| 2,697,147 | Harland | Dec. 14, 1954 |
| 2,738,392 | Talbott | Mar. 13, 1956 |
| 2,740,598 | Van Krevelen | Apr. 3, 1956 |
| 2,742,246 | Mellen | Apr. 17, 1956 |
| 2,871,597 | Yost | Feb. 3, 1959 |
| 2,907,843 | Thorness | Oct. 6, 1959 |